(12) United States Patent
Evans (10) Patent No.: US 10,399,279 B2
(45) Date of Patent: Sep. 3, 2019

(54) IMGL OF INSTRUMENT PANELS WITH PSIR CHUTES USING PRESSURE BONDING

(71) Applicant: Inoac USA, Inc., Troy, MI (US)

(72) Inventor: Gregg S. Evans, Stratford (CA)

(73) Assignee: INOAC USA, INC., Troy, MI (US)

( * ) Notice: Subject to any disclaimer, the term of this patent is extended or adjusted under 35 U.S.C. 154(b) by 153 days.

(21) Appl. No.: 15/406,130

(22) Filed: Jan. 13, 2017

(65) Prior Publication Data

US 2017/0129166 A1    May 11, 2017

Related U.S. Application Data

(60) Provisional application No. 62/278,097, filed on Jan. 13, 2016.

(51) Int. Cl.
*B29C 65/00* (2006.01)
*B29C 51/10* (2006.01)
(Continued)

(52) U.S. Cl.
CPC ........ *B29C 66/8266* (2013.01); *B23K 20/106* (2013.01); *B23K 20/233* (2013.01);
(Continued)

(58) Field of Classification Search
CPC ............. B29C 66/8266; B29C 66/343; B29C 66/5326; B29C 66/723; B29C 66/81433;
(Continued)

(56) References Cited

U.S. PATENT DOCUMENTS

| 4,087,037 A * | 5/1978 | Schier .................. B21D 26/055 |
| | | 219/85.17 |
| 4,836,765 A | 6/1989 | Kornitzky et al. |

(Continued)

FOREIGN PATENT DOCUMENTS

| DE | 102009005313 A1 | 9/2010 |
| EP | 2636497 A1 | 9/2013 |

(Continued)

OTHER PUBLICATIONS

International Search Report and Written Opinion dated Mar. 30, 2017 in International Application No. PCT/US2017/013475.

(Continued)

*Primary Examiner* — James Sanders
*Assistant Examiner* — Ninh Le
(74) *Attorney, Agent, or Firm* — Dykema Gossett PLLC (57) ABSTRACT

A method for manufacturing an automotive interior component may include providing a cover, a substrate, a chute connected to the substrate, heating the cover, forming the cover via a negative vacuum forming tool, and supporting the substrate and chute via a buck. The method may include moving at least of the negative vacuum forming tool and the buck toward the other of the negative vacuum forming tool and the buck such that the cover and the substrate may be in contact with each other. The method may include bonding the substrate with the cover via providing pressurized fluid to a chamber of the buck to force the substrate toward the cover. The chamber may be defined by the buck and the substrate.

11 Claims, 9 Drawing Sheets

(51) Int. Cl.

| | | |
|---|---|---|
| *B29C 51/18* | (2006.01) | |
| *B29C 65/06* | (2006.01) | |
| *B29C 65/48* | (2006.01) | |
| *B60R 21/205* | (2011.01) | |
| *B60R 21/215* | (2011.01) | |
| *B23K 20/10* | (2006.01) | |
| *B23K 20/233* | (2006.01) | |
| *B29C 65/78* | (2006.01) | |
| *B29C 65/02* | (2006.01) | |
| *B60R 21/2165* | (2011.01) | |
| *B29L 31/30* | (2006.01) | |
| *B23K 101/00* | (2006.01) | |
| *B23K 103/00* | (2006.01) | |

(52) U.S. Cl.
CPC ............. *B29C 51/10* (2013.01); *B29C 51/18* (2013.01); *B29C 65/02* (2013.01); *B29C 65/06* (2013.01); *B29C 65/48* (2013.01); *B29C 65/7847* (2013.01); *B29C 66/1122* (2013.01); *B29C 66/343* (2013.01); *B29C 66/5326* (2013.01); *B29C 66/723* (2013.01); *B29C 66/81433* (2013.01); *B29C 66/8322* (2013.01); *B60R 21/205* (2013.01); *B60R 21/215* (2013.01); *B60R 21/2165* (2013.01); *B23K 2101/006* (2018.08); *B23K 2103/34* (2018.08); *B29C 65/482* (2013.01); *B29C 65/4825* (2013.01); *B29C 66/71* (2013.01); *B29C 66/727* (2013.01); *B29C 66/81422* (2013.01); *B29L 2031/3008* (2013.01); *B29L 2031/3038* (2013.01)

(58) Field of Classification Search
CPC . B29C 66/8322; B29C 66/1122; B29C 66/71; B29C 66/727; B29C 66/81422; B29C 65/7847; B29C 65/02; B29C 65/48; B29C 65/06; B29C 65/4825; B29C 65/482; B29C 51/18; B29C 51/10; B23K 20/106; B23K 20/233; B23K 2103/34; B23K 2101/006; B60R 21/2165; B60R 21/205; B60R 21/215; B29L 2031/3008; B29L 2031/3038

See application file for complete search history.

(56) References Cited

U.S. PATENT DOCUMENTS

| | | |
|---|---|---|
| 6,056,531 A | 5/2000 | Furuya et al. |
| 6,131,945 A | 10/2000 | Labrie et al. |
| 6,386,856 B1 | 5/2002 | Chern et al. |
| 6,595,543 B2 | 7/2003 | Desprez |
| 8,236,217 B2 | 8/2012 | Evans |
| 9,193,141 B2 | 11/2015 | Evans |
| 2003/0012839 A1 | 1/2003 | Evans et al. |
| 2005/0040569 A1 | 2/2005 | Fitzell, Jr. |
| 2005/0140059 A1 | 6/2005 | Ernst et al. |
| 2008/0211208 A1* | 9/2008 | Evans ................. B60R 21/2165 280/728.3 |
| 2009/0205777 A1* | 8/2009 | McLaughlin ....... B32B 37/1027 156/285 |
| 2011/0056611 A1* | 3/2011 | Evans ................. B60R 21/2165 156/73.5 |
| 2013/0001931 A1 | 1/2013 | Evans |
| 2013/0093297 A1 | 4/2013 | Guan et al. |
| 2013/0147166 A1* | 6/2013 | Cowelchuk ........... B60R 21/215 280/728.3 |
| 2015/0224954 A1 | 8/2015 | Evans |

FOREIGN PATENT DOCUMENTS

| | | | |
|---|---|---|---|
| JP | 2007091024 A * | 4/2007 | .......... B29C 66/112 |
| WO | 2015164623 A1 | 10/2015 | |

OTHER PUBLICATIONS

International Search Report and Written Opinion dated Jul. 24, 2015 in International App. No. PCT/US2015/027326.
International Preliminary Report on Patentability dated Oct. 25, 2016 in International App. No. PCT/US2015/027326.
Machine Translation (English Language) Version of DE 102009005313.

* cited by examiner

IMGL OF INSTRUMENT PANELS WITH PSIR CHUTES USING PRESSURE BONDING

CROSS-REFERENCE TO RELATED APPLICATIONS

This application claims the benefit of U.S. provisional application No. 62/278,097, filed 13 Jan. 2016 (the '097 application). U.S. application Ser. No. 14/693,409, filed 22 Apr. 2015 (the '409 application), U.S. application Ser. No. 13/953,479, filed 29 Jul. 2013 (the '479 application"), U.S. application Ser. No. 13/569,004, filed 7 Aug. 2012 (the '004 application"), U.S. application Ser. No. 12/946,432, filed 15 Nov. 2010 (the '432 application), U.S. application Ser. No. 11/952,503, filed 7 Dec. 2007 (the '503 application), U.S. provisional application No. 60/873,274, filed 7 Dec. 2006 (the '274 application), and the '097 application are all hereby incorporated by reference as though fully set forth herein.

BACKGROUND a. Technical Field

The disclosure relates generally to automotive interior components, an apparatus for and method of manufacture thereof, and, more particularly, to an apparatus for and method of pressure bonding of a covering on an automotive interior component, which allows for press bonding of materials with complex shapes and angles.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Automobiles are commonly equipped with airbags for reducing driver and passenger injuries, such as in the case of an accident. Automobile airbags are generally located in areas where a driver or passenger would potentially contact an automobile interior in the event of an accident. Airbags can reduce injuries by providing a substantially non-solid surface for the driver or passenger to contact, as opposed to the generally solid surfaces of the automotive interior. Although the functionality of the airbag is greatly valued, the visual appeal of the instrument panel, and relative invisibility of the airbag system may also be of value to automobile manufacturers and/or consumers.

In order to install an airbag, the airbag is generally folded into a module that is installed into or behind an automotive interior component. The module housing a passenger-side airbag is generally installed on the underside of a hard substrate (molded to form the component, e.g., instrument panel), within a passenger side inflatable restraint (PSIR) chute protruding behind the substrate. The substrate may include a pre-weakened area, which may facilitate the airbag releasing therethrough. A PSIR chute may be bonded to the substrate, and may include doors that line up with the pre-weakened area of the instrument panel. A known method for attaching a PSIR chute to an instrument panel (e.g., substrate) includes vibration welding the PSIR chute to the instrument panel, which is discussed in greater detail in U.S. Pat. No. 9,193,141.

The aforementioned automotive interior components may include a hard substrate, an outer skin (e.g., TPO, Urethane, or PVC), and a polypropylene, polyethylene or polyurethane foam layer sandwiched therebetween. The outer skin/cover may generally attached to the hard substrate to give the texture and appearance desired by the customers, and the foam layer may provide or enhances the softness of the component. Premium touch skin/cover materials (e.g., soft-touch, fabric-backed leather-like materials) may be added through corner sewing, edge wrap, trimming, and/or combinations thereof.

It may be desirable to install an aesthetically-pleasing covering over the instrument panel, such as a "bilaminate" covering with a foam layer and a soft, leather-like layer. Use of a bilaminate covering can limit the choice of mechanisms to attach the PSIR chute to the instrument panel (and vice versa). For example, if the PSIR chute is attached to the instrument panel first, it may then be difficult to use conventional in-mold grain lamination vacuum forming (IMGL) with the bilaminate covering and/or the instrument panel due to the complex geometries of the PSIR chute (e.g., angle of the airbag chute protrusion). However, if the bilaminate covering is bonded to the instrument panel (e.g., substrate) first, then the options may be limited as to how to attach the PSIR chute to the instrument panel without visual distortion to the instrument panel and, thus, the bilaminate covering it supports.

The foregoing discussion is intended only to illustrate the present field and should not be taken as a disavowal of claim scope.

SUMMARY

Among other things, various embodiments disclosed herein are directed to an apparatus for manufacturing an automotive interior component and a method for manufacture thereof. In particular, the instant disclosure relates to an apparatus for pressure bonding of a covering on an automotive interior component and a method for press bonding thereof.

A method of manufacturing an automotive interior component may include providing a cover, a substrate; a chute connected to the substrate, heating the cover, forming the cover via a negative vacuum forming tool, and supporting the substrate and chute via a buck. The method may include moving at least of the negative vacuum forming tool and the buck toward the other of the negative vacuum forming tool and the buck such that the cover and the substrate may be in contact with each other. The method may include bonding the substrate with the cover via providing pressurized fluid to a chamber of the buck to force the substrate toward the cover. The chamber may be defined by the buck and the substrate.

In embodiments, an apparatus for manufacturing an automotive interior component may comprise a heating device that may be configured to heat a cover of the automotive interior component, a frame that may be configured to support the cover, a negative vacuum forming tool, and/or a buck that may be configured to support a substrate of the automotive interior component. In embodiments, the buck may be configured to receive pressurized fluid to force the substrate toward the cover.

The foregoing and other aspects, features, details, utilities, and advantages of the present disclosure will be apparent from reading the following description and claims, and from reviewing the accompanying drawings.

DETAILED DESCRIPTION

Figure 1:
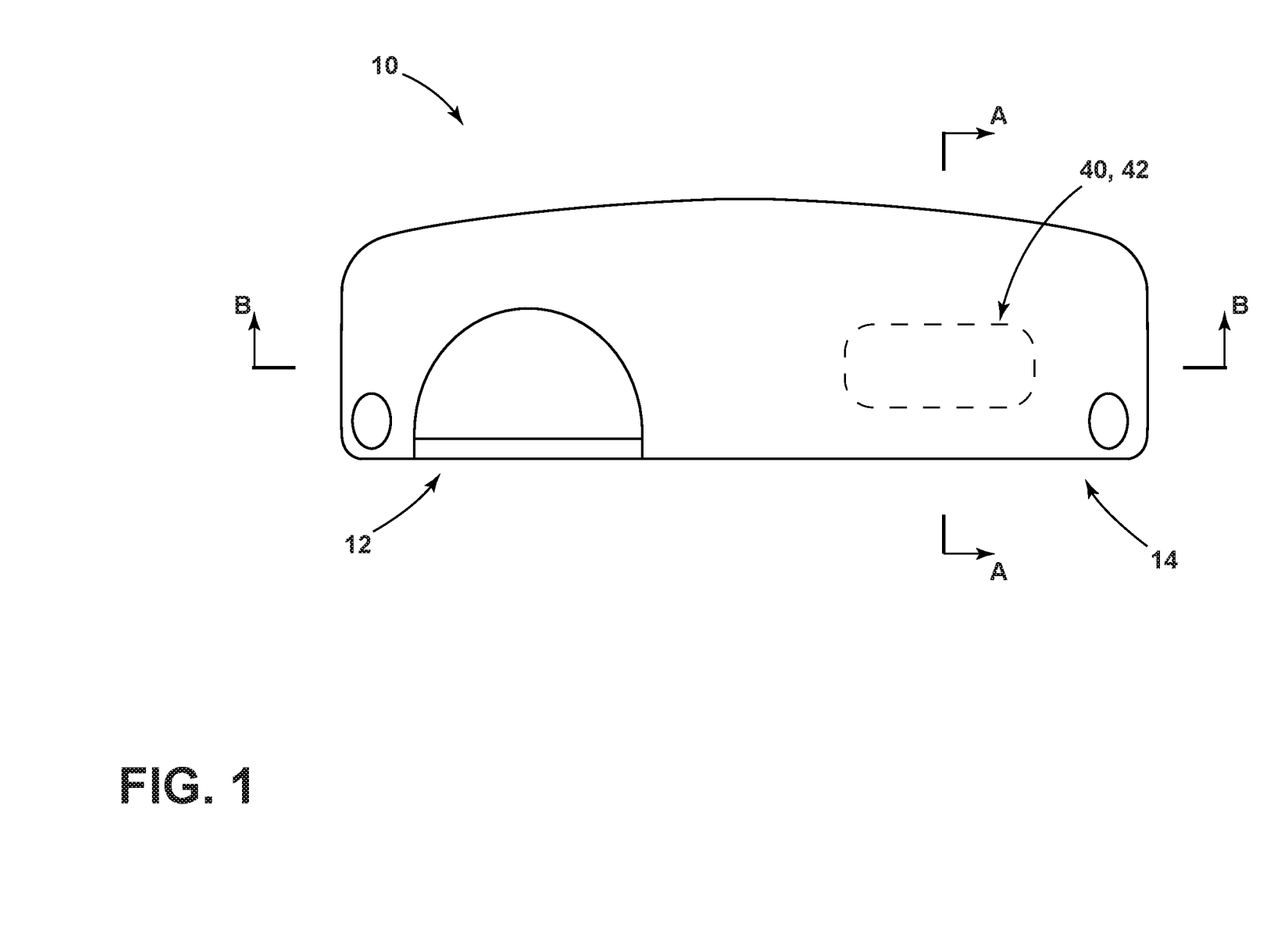
FIG. 1 is a top view generally illustrating an automotive interior component in accordance with embodiments of the present disclosure.
Figure 2A:
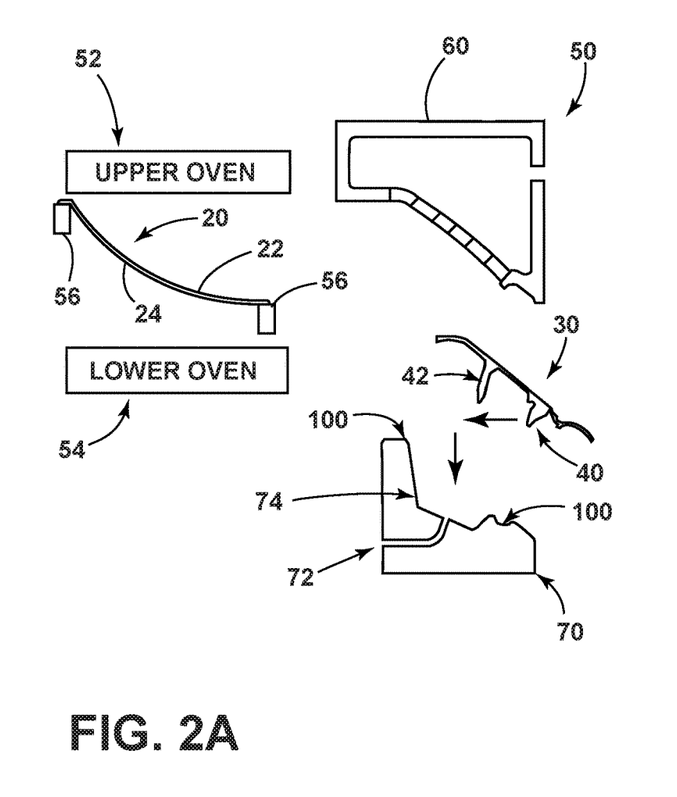
FIGS. 2A-2B are cross-sectional views generally illustrating portions of an apparatus for manufacturing an automotive interior component and cross-sectional views of portions of the automotive interior component in accordance with embodiments of the present disclosure.
Figure 2B:
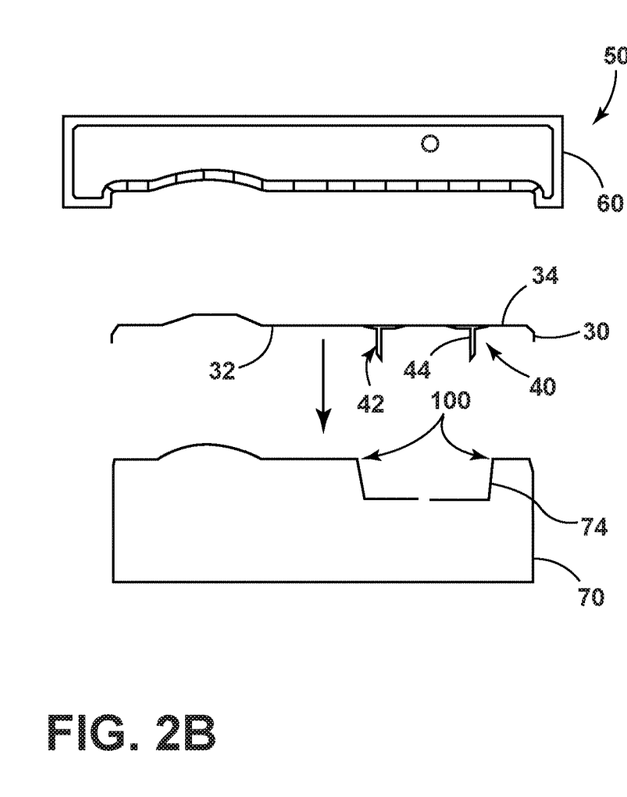

Referring now to the drawings wherein like reference numerals are used to identify identical or similar components in the various views. FIG. 1 a top view generally illustrating an automotive interior component 10 in accordance with embodiments of the present disclosure. FIG. 2A is a are cross-sectional view taken generally along line A-A in FIG. 1. FIG. 2B is a are cross-sectional view taken generally along line B-B in FIG. 1.

As shown in FIGS. 1 and 2A-2B, the automotive interior component 10 may include a first section 12 (e.g., a driver's side), a second section 14 (e.g., a passenger side), a cover (or covering) 20 (shown in FIG. 2A), a substrate 30 (shown in FIG. 2A), and/or an airbag assembly 40 (shown in FIG. 2A). In embodiments, automotive interior component 10 may include an instrument panel and/or may be referred to herein as instrument panel 10. As shown in FIG. 1, the airbag assembly 40 is disposed below the visible top surface of automotive interior component 10 (i.e., shown in an exemplary position enclosed by dashed-lines). In embodiments, airbag assembly 40 may be disposed at or about an inner surface 32 of substrate 30 at or about second section 14.

In embodiments, a method of manufacturing instrument panel 10 may include one or more of a variety of steps and/or actions. In embodiments, such as generally illustrated in FIGS. 2A-2B, manufacturing may include providing a manufacturing apparatus 50, cover 20 of instrument panel 10, and/or substrate 30 of instrument panel 10. In embodiments, manufacturing apparatus 50 may include an upper oven 52, a lower oven 54, a frame 56, an upper fixture 60, and/or a lower fixture 70.

In embodiments, cover 20 may include, for example, a bilaminate material, and/or may be referred to as a skin. Cover 20 may be supported, at least initially, via frame 56 (e.g., a clamp frame). In embodiments, cover 20 may be heated to a predetermined temperature, such as via upper oven 52, which may include one or more of a variety of devices that may be configured to heat cover. Heating of the cover 20 increases the flexibility of the cover 20 so as to improve its conformance to the shape of the upper fixture 60, as well as improving the ability of the skin layer (having surface 24) to take on the grain/pattern imparted by the upper fixture 60 (described below).

The cover 20 may comprise a two-layer composite comprising an outer skin layer and an inner foam layer where the cover 20 has an exposed outer surface 22, which constitutes a visible surface in the finished automotive interior component 10, and an exposed inner surface 24 (of the foam layer). The foam layer may consist of a high-density skin and a low-density core. The foam layer may comprise urethane in an embodiment. The outer skin layer may comprise a premium-touch and/or soft-touch material in accordance with an embodiment. For example only and without limitation, the outer skin layer may comprise premium artificial and/or imitation leather in an embodiment.

Due to cover 20 having at least two layers, upper oven 52 alone may not adequately heat the cover 20 throughout its entire thickness. Accordingly, lower oven 54 may be used in combination with upper oven 52 in order to heat the cover 20 through its thickness. The predetermined temperature to which upper and lower ovens 52, 54 heat cover 20 may be about 400 degrees Fahrenheit, ±50 degrees Fahrenheit. It should be understood that the above temperature range re is exemplary only and not limiting in nature, as variations (including the amount of time to achieve the predetermined temperature) are possible, dependent upon the materials used, their respective thickness, and the like.

In embodiments, substrate 30 may include and/or may be connected to an airbag chute 42 of airbag assembly 40, which may include plural protrusions 44 extending from substrate 30. Substrate 30 may be disposed and/or loaded into lower fixture 70, which may be referred to as buck 70. Loading of substrate 30 into buck 70 may occur while cover 20 is being heated (e.g., via upper and/or lower ovens 52, 54).

Substrate 30 may comprise a polymer in accordance with some embodiments. Although substrate 30 is described as comprising a polymer in some embodiments, the substrate 30 may comprise any number of materials in accordance with various other embodiments. For example only and without limitation, substrate 30 may comprise polycarbonate/acrylonitrile butadiene styrene (PCABS), poly(propylene fumarate) (PPF), shape-memory alloy (SMA), and/or thermoplastic polyolefin (TPO).

Figure 3A:
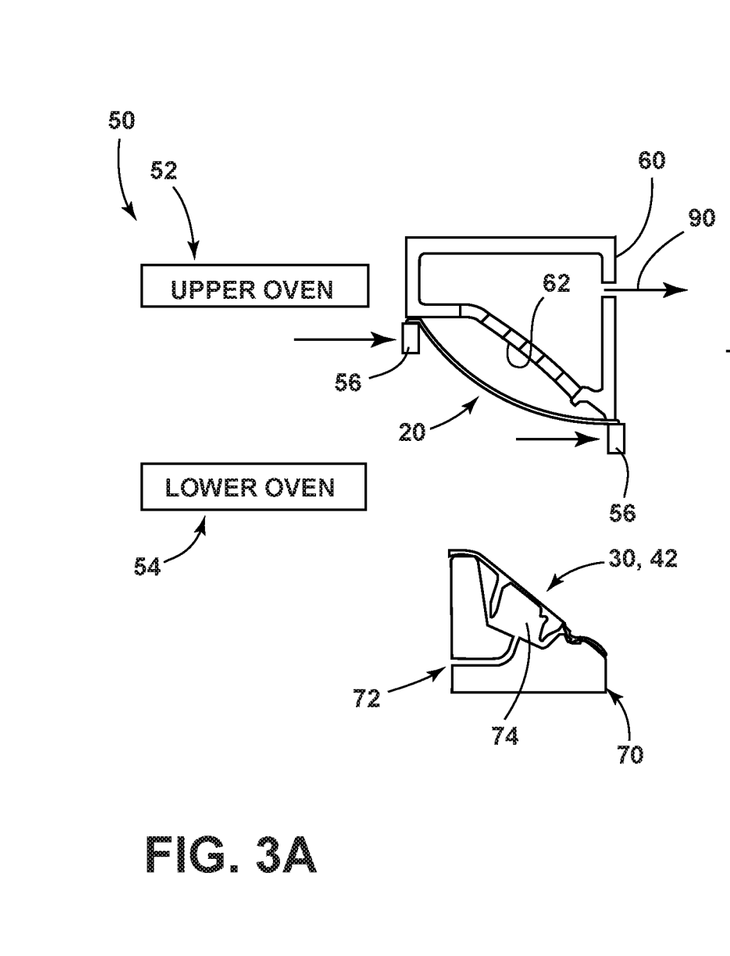
FIGS. 3A-3B are cross-sectional views generally illustrating portions of an apparatus for manufacturing an automotive interior component and cross-sectional views of portions of the automotive interior component, with a cover of the automotive interior component supported by a frame relative to a negative vacuum forming tool and a buck supporting a substrate of the automotive interior component in accordance with embodiments of the present disclosure.
Figure 3B:
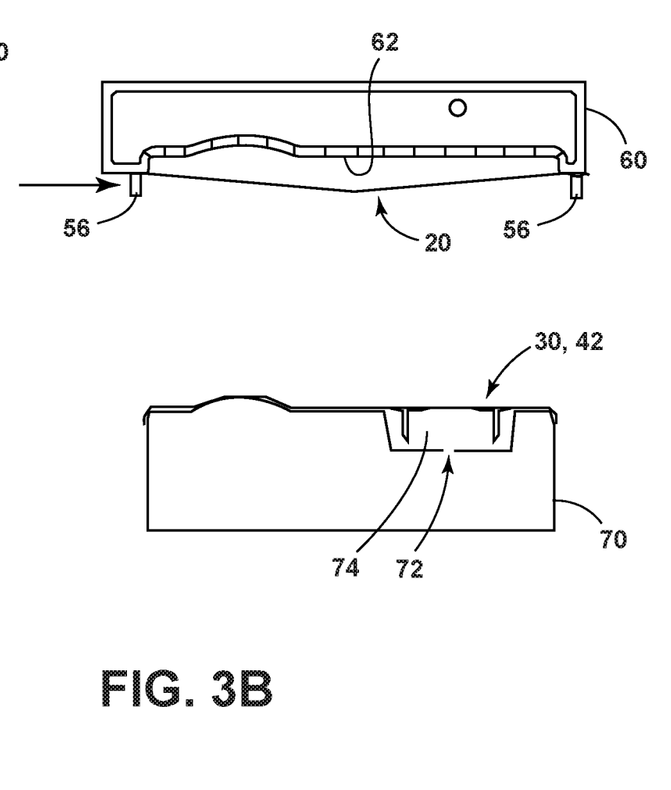

FIG. 3A is a cross-sectional view taken generally along line A-A in FIG. 1 while FIG. 3B is a cross-sectional view taken generally along line B-B in FIG. 1. In embodiments, such as generally illustrated in FIGS. 3A-3B, cover 20 may be removed from the upper and/or lower ovens 52, 54 and may be moved toward upper fixture 60 (e.g., via clamp frame 56). In particular, frame 56 may index (i.e., move) the heated cover 20 relative to upper fixture 60. In embodiments, upper fixture 60 may comprise a negative vacuum forming (NVF) tool and/or may be referred to herein as NVF tool 60. As shown, movement of the frame 56 positions the heated cover 20 so as to overlay a surface 62 of the NVF tool 60. As shown particularly in FIG. 3B, the extreme edges of the heated cover 20 overlay planar land areas of the NVF tool 60.

Figure 4A:
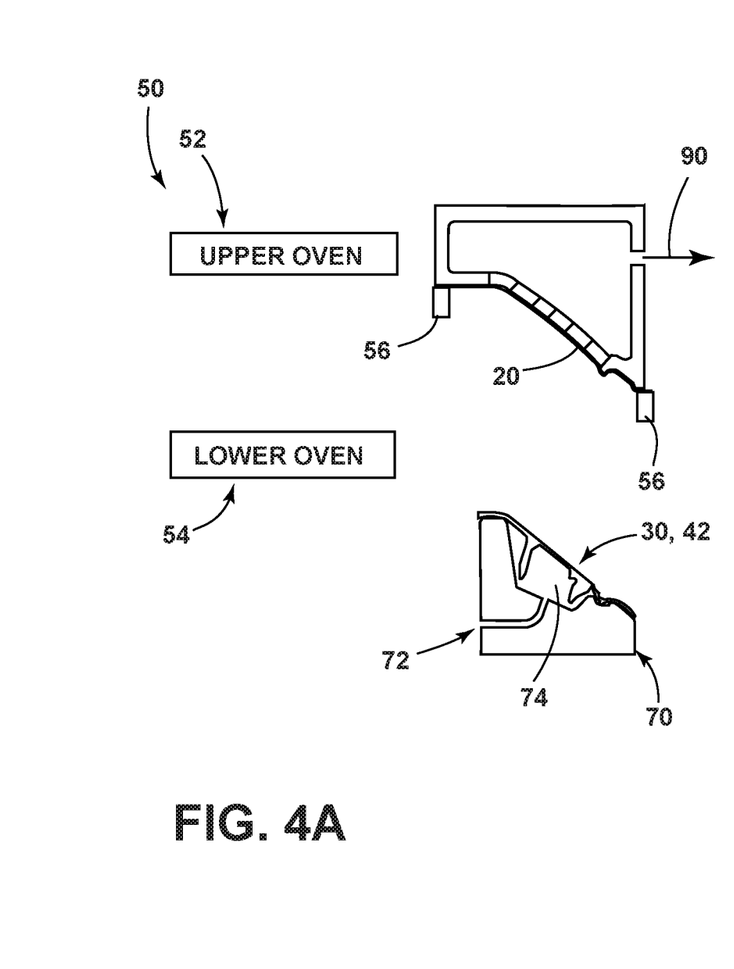
FIGS. 4A-4B are cross-sectional views generally illustrating portions of an apparatus for manufacturing an automotive interior component and cross-sectional views of portions of the automotive interior component, with a cover of the automotive interior component pressed against a negative vacuum forming tool in accordance with embodiments of the present disclosure.
Figure 4B:
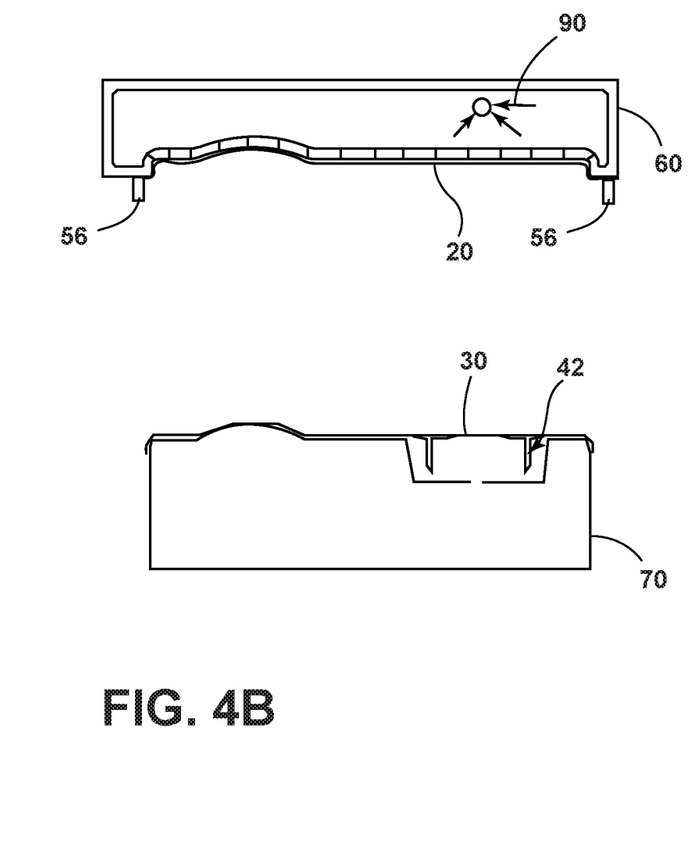

FIG. 4A is a cross-sectional view taken generally along line A-A in FIG. 1 while FIG. 4B is a cross-sectional view taken generally along line B-B in FIG. 1. In embodiments, such as generally illustrated in FIGS. 4A-4B, a fluid 90 (e.g., air or other fluid) may be removed from (e.g., fluid pressure may be lowered within) NVF tool 60, which may pull/force cover 20 toward an outer surface 62 of NVF tool 60 and/or may form (deform) the outer surface 22 of cover 20 according to outer surface 62 of the NVF tool 60. In embodiments, outer surface 62 of NVF tool 60 may include a pattern, such as, for example, a leather grain and/or stitching pattern.

A fluid vacuum (not shown) is coupled to NVF 60 (FIG. 4A) and is configured to evacuate fluid 90 from the upper chamber of NVF 60. In an embodiment, an atmospheric pressure level is present and applies to inner surface 24 of cover 20 while the fluid vacuum is configured to produce a predetermined vacuum level sufficient to cause the cover 20 to conform to surface 62. It should be appreciated that the pressure differential across the cover 20 operates to produce a force moving the cover 20 against surface 62. In an embodiment, the vacuum level produced in the NVF tool 60 may be about 70% of atmospheric pressure (e.g., ~101 kPa). It should be understood, however, that other, respective pressure levels giving rise to a different pressure differential across cover 20 may be used, depending on a variety of factors (e.g., materials used in cover 20, thickness of layers in cover 20, the temperature to which cover 20 has been heated, the depth/character of the grain/pattern desired to be impressed into visible surface 22 of cover 20, and the like).

Figure 5A:
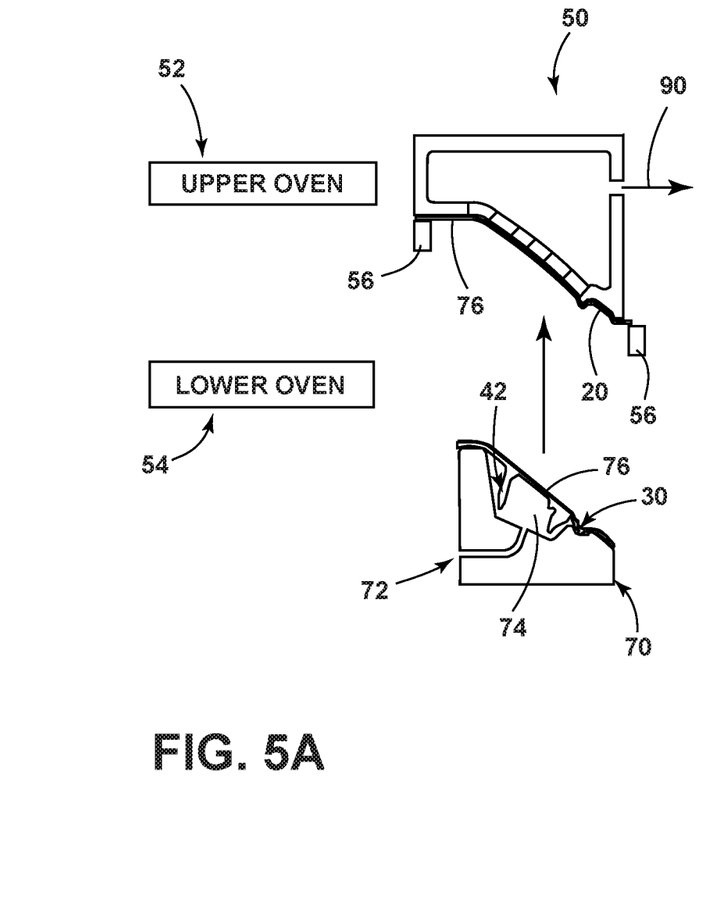
FIGS. 5A-5B are cross-sectional views generally illustrating portions of an apparatus for manufacturing an automotive interior component and cross-sectional views of portions of the automotive interior component in accordance with embodiments of the present disclosure.
Figure 5B:
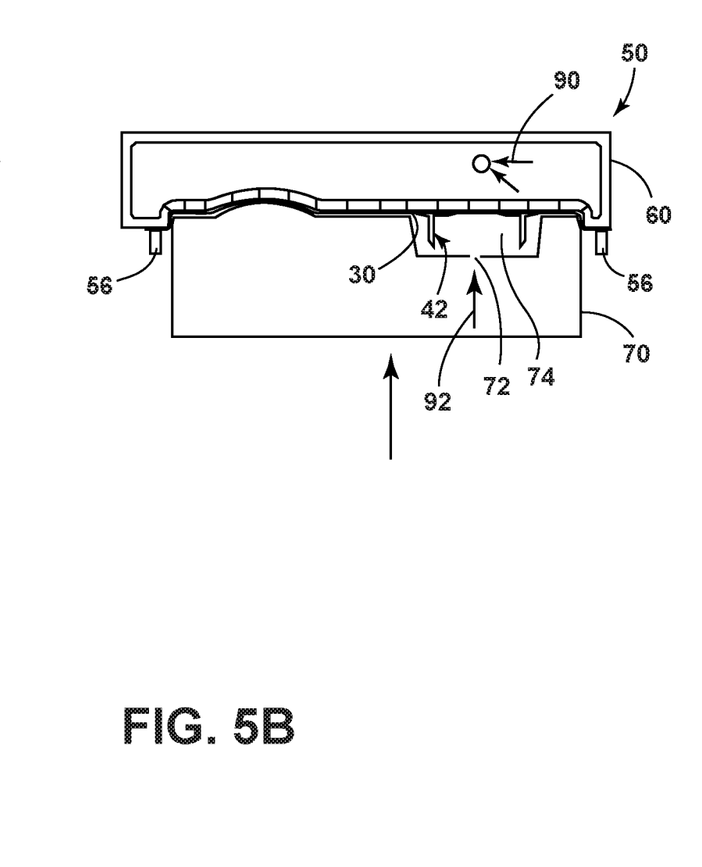

FIG. 5A is a cross-sectional view taken generally along line A-A in FIG. 1 while FIG. 5B is a cross-sectional view taken generally along line B-B in FIG. 1. In embodiments, such as generally illustrated in FIGS. 5A-5B, buck 70, which may be configured for supporting/holding substrate 30 and/or chute 42, may be moved toward cover 20 and NVF tool 60, which may move substrate 30 and/or chute 42 toward cover 20 and NVF tool 60. The relative movement of upper and lower fixtures 60, 70 towards each presses the outer surface 34 of substrate 30 into the inner surface 24 (i.e., foam layer) of the cover 20.

In embodiments, a connecting element 76 (e.g., adhesive, glue, or the like) may be disposed at or about an outer surface 34 of substrate 30 and/or an inner surface 24 of cover 20, which may include foam. The adhesive may be a solvent- or water-based, pressure- or heat-activated glue. In one embodiment, the adhesive may be an adhesive commercially sold by Sunstar Incorporated under the trademark Penguin™. In embodiments, connecting element 76 may be configured to connect (e.g., bond/laminate) substrate 30 with cover 20 upon substrate 30 coming into contact with inner surface 24 of cover 20 to form an assembled instrument panel 10.

Figure 6A:
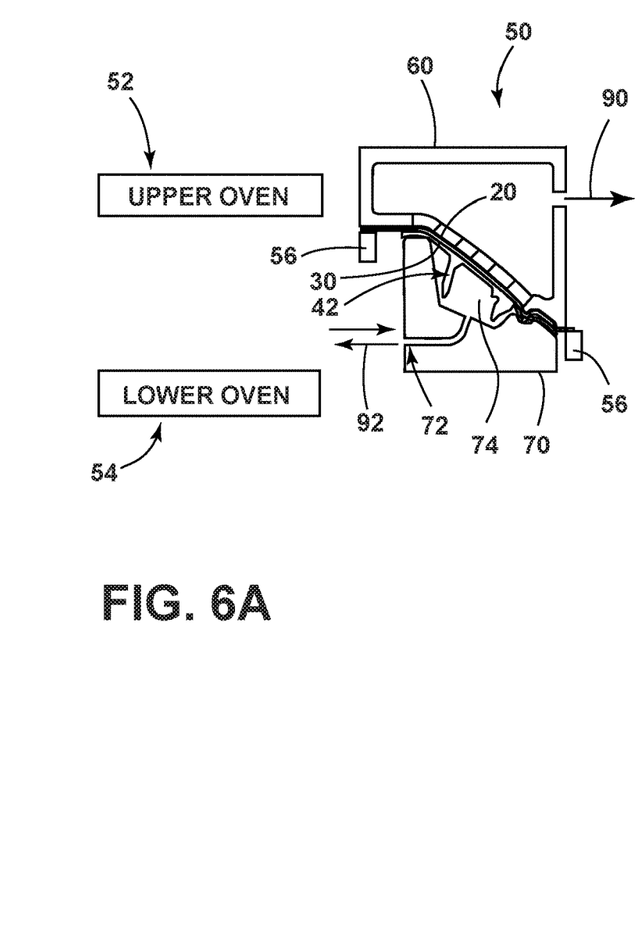
FIGS. 6A-6B are cross-sectional views generally illustrating portions of an apparatus for manufacturing an automotive interior component and cross-sectional views of portions of the automotive interior component, with pressurized fluid provided to a buck and the underside of a substrate of the automotive interior component to press the substrate toward a cover in accordance with embodiments of the present disclosure.
Figure 6B:
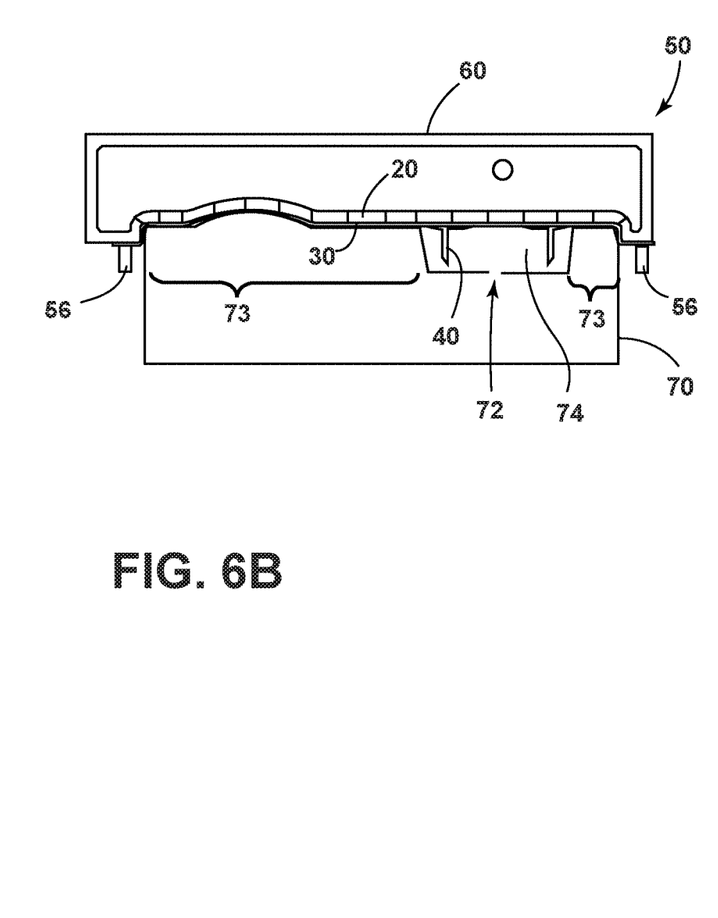

FIG. 6A is a cross-sectional view taken generally along line A-A in FIG. 1 while FIG. 6B is a cross-sectional view taken generally along line B-B in FIG. 1. In embodiments, such as generally illustrated in FIGS. 6A-6B, a pressurized fluid 92 (e.g., air) may be provided to buck 70 from a fluid supply source (not shown). Pressurized fluid 92 may enter buck 70 via one or more apertures/passageways 72 and/or may flow into a chamber 74 that may be defined and/or disposed between substrate 30 and buck 70. In embodiments, a seal 100 (e.g., an aircraft-type door seal) may be provided and/or formed at or near the outer edges of the chute contact zone on substrate 30, which may permit the fluid pressure to build within chamber 74. Pressurized fluid 92 may continue to be provided to chamber 74, which may increase the fluid pressure in chamber 74 such that substrate 30 may be forced outward (e.g., toward cover 20). Forcing substrate 30 outward may facilitate connecting/bonding of substrate 30 with cover 20 (e.g., forming of assembled instrument panel 10).

In an embodiment, the fluid supply source (not shown) may be configured to provide air flow 92 so as to maintain a predetermined pressure in pressure chamber, for example only, a pressure between about 10-30 psi, and may be about 20 psi in one embodiment.

In embodiments, buck 70 (and/or NVF tool 60) may be configured to mechanically press/push substrate 30 and cover 20 against each other outside of the pressure cavity (74) seal. The areas of mechanical clamping force are designated 73 in FIG. 6B. In an embodiment, the mechanical clamping force may be operative to compress the cover 20 by about 1 mm, although it should be understood this exemplary in nature and not limiting.

However, it may be difficult to press substrate 30 against cover 20 at or near chute 42 and it may not be feasible to directly press on chute 42 (e.g., chute 42 may include plastic elements, such as plastic hinges). Additionally or alternatively, chute 42 may be disposed at an angle (e.g., an oblique angle) relative to substrate 30, which may make it difficult to press substrate 30 against cover 20 at or near chute 42. In an embodiment, the protrusion of the chute may have complex geometries (e.g., angle of the airbag chute protrusion) such that physical contact of a press component (i.e., fixture) with the back surface of the substrate is prevented in undercut/covered zones, thereby preventing even pressure on the interior component to activate the glue. In embodiments, it may be desirable to provide a substantially uniform pressing force between substrate 30 and cover 20 (e.g., to avoid unbonded skin areas which could fragment during airbag deployment and be projected toward the occupant as well as to avoid wrinkles and/or other deformations). In embodiments, providing pressurized fluid 92 to buck 70 (e.g., in/into chamber) may permit substrate 30 to be pressed against cover 20 even if substrate 30 already includes and/or is already connected to chute 42. The fluid pressure in chamber 74 may be relatively uniform, which may permit a pressing force between substrate 30 and cover 20 to be substantially uniform and/or consistent with other areas of substrate 30 that may be pressed directly by buck 70 and/or between buck 70 and NVF tool 60. In sum, air flows (i.e., flow 92) under pressure into the pressure cavity 74 in the buck 70, pressing the assembly 40/chute 42 into the cover 20 without mechanical force. The other zones (e.g., area 73) are pressed together by the mechanical force between the buck 70 and the upper NVF tool 60. Pressure within the pressure cavity 74 force the cover 20, glue (connecting element 80) and substrate 30 together within the zone of the airbag assembly 40/chute 42.

Figure 7A:
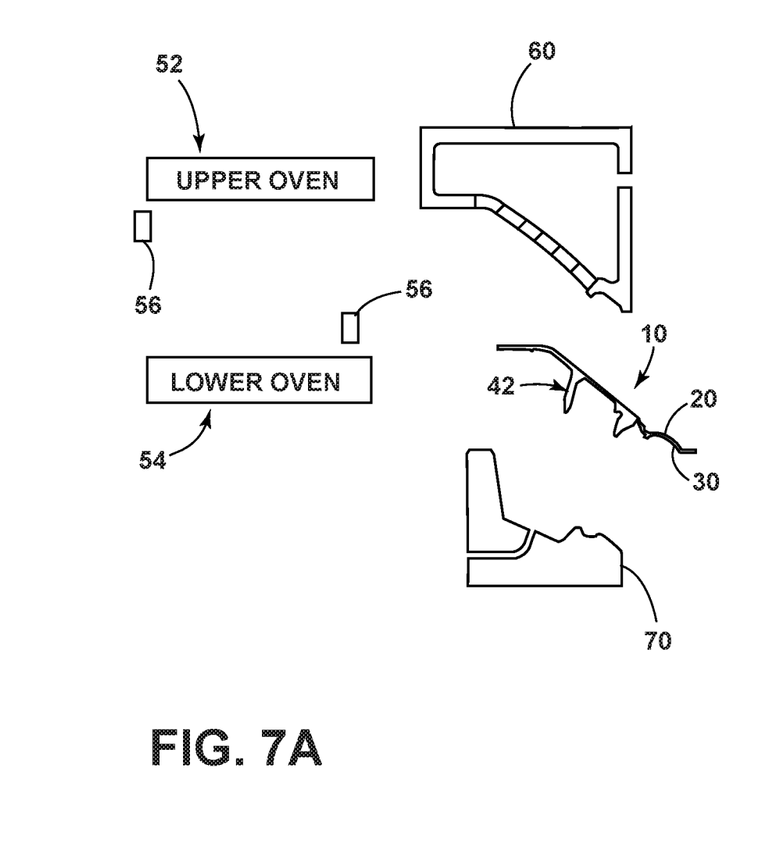
FIGS. 7A-7B are cross-sectional views generally illustrating portions of an apparatus for manufacturing an automotive interior component and cross-sectional views of portions of an assembled configuration of the automotive interior component in accordance with embodiments of the present disclosure.
Figure 7B:
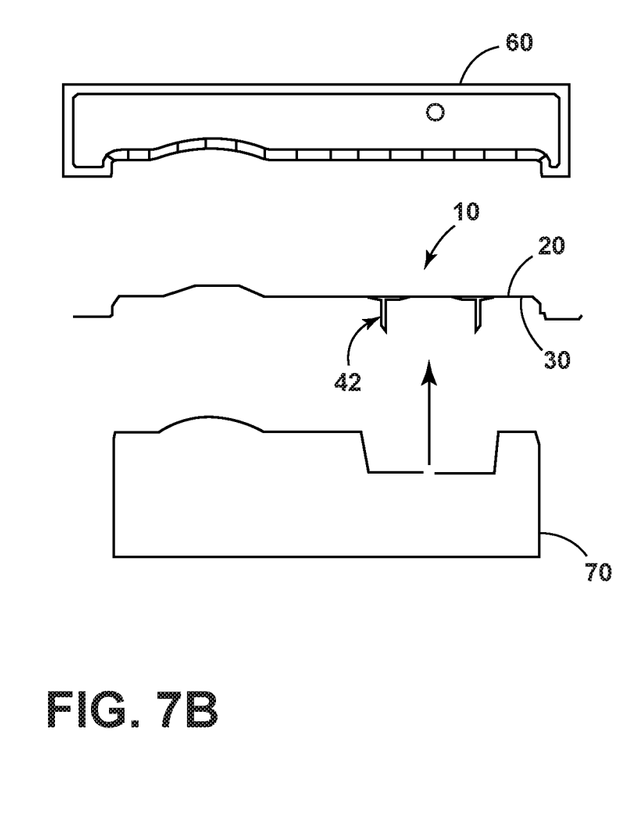

FIG. 7A is a cross-sectional view taken generally along line A-A in FIG. 1 while FIG. 7B is a cross-sectional view taken generally along line B-B in FIG. 1. In embodiments, such as generally illustrated in FIGS. 7A-7B, once instrument panel 10 is formed (e.g., via connecting/bonding of substrate 30 with cover 20), frame 56 may move away from NVF tool 60 (e.g., to its original position as shown in FIG. 2A), buck 70 may move away from NVF tool 60, and/or instrument panel 10 may be removed from manufacturing apparatus 50.

In embodiments, chute 42 may be connected to substrate 30 via one or more of a variety of methods. For example, and without limitation, chute 42 may be connected to substrate 30 via one or more of the methods and/or apparatuses described in U.S. Pat. No. 9,193,141 and/or U.S. Pat. No. 8,236,217. In embodiments, chute 42 may be connected to substrate 30 prior to substrate 30 being connected/bonded with cover 20. Previous methods of assembly may not be compatible with connecting a substrate to a cover (e.g., a bilaminate cover) if a chute has already been connected to the substrate.

Figure 8:
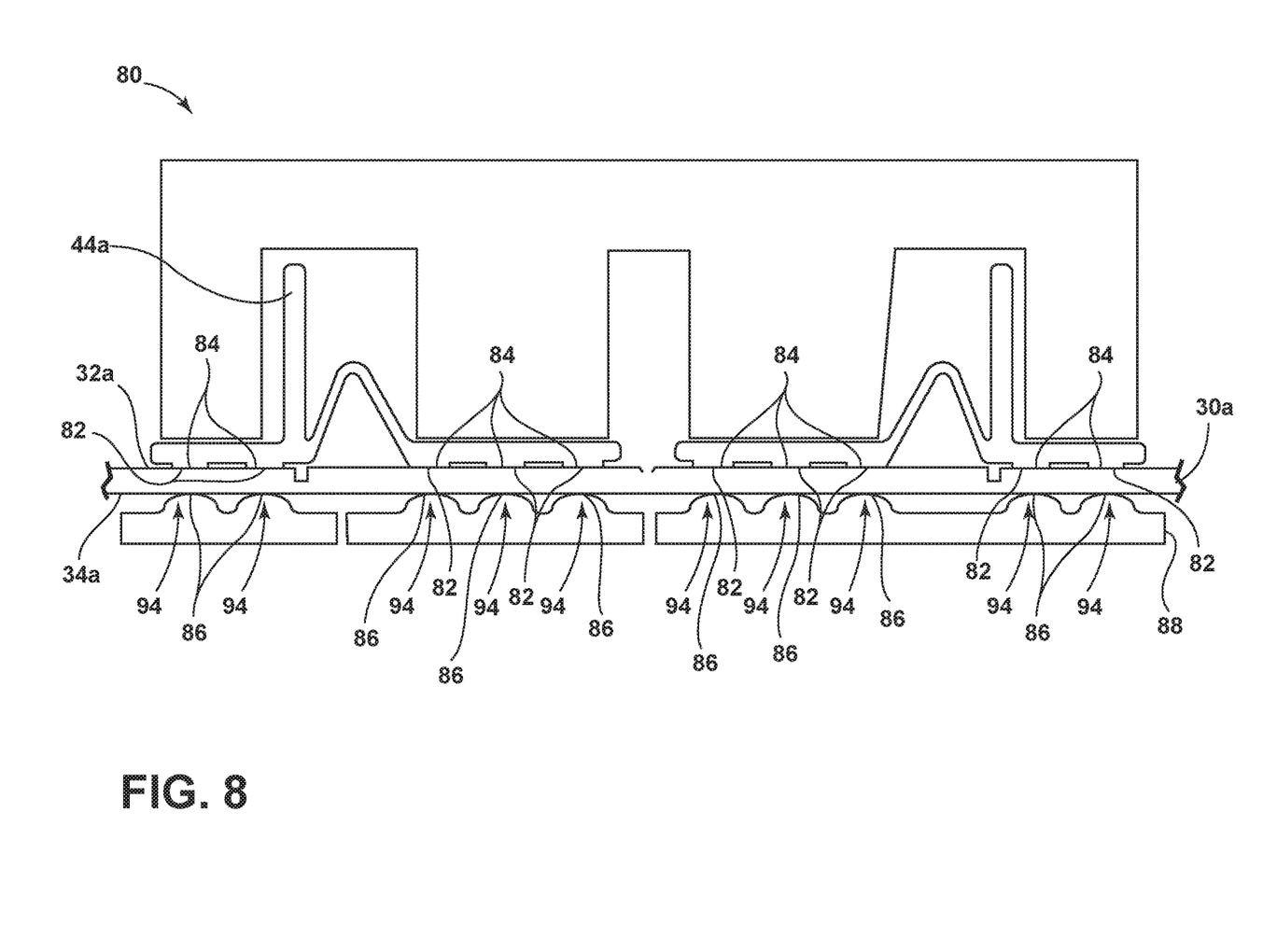
FIG. 8 is a schematic cross-sectional view of a welding apparatus for use in connection with vibration welding a protrusion to a substrate of an automotive interior component, in an embodiment.

FIG. 8 is a schematic cross-sectional view of a welding apparatus 80 for use in connection with vibration welding a protrusion 44a to a substrate 30a in accordance with an embodiment of the present teachings. Such a welding apparatus 80 may be used to provide a substrate 30 that already includes an airbag assembly 40/chute 42 (including protrusion(s) 44) attached thereto, such as described above in connection with FIGS. 2A-7B. As described in more detail in the '479 application, vibration welding generally involves the physical movement of protrusion 44a having weld bars 82 relative to substrate 30a, with weld bars 82 being moved back and forth horizontally relative to substrate 30a under pressure. This physical movement creates heat which melts affected areas 84 of back surface 32a of substrate 30a, and thus allows weld bars 82 to be welded to substrate 30a upon cooling of areas 84 when the relative movement is stopped. Upon cooling, the thermal shrinkage in areas 84 causes compression in areas 84 and tension in the opposite visible areas 86 of substrate 30a.

Still referring to FIG. 8, welding apparatus 80 includes a modified weld fixture 88 (illustrated as a lower weld fixture in FIG. 7) including a plurality of spaced convex pre-stressors 90 (for simplicity, only some of the pre-stressors 90 are numbered/identified in FIG. 8). In the embodiment illustrated, each pre-stressor 90 may be a smooth convex curved shape; however, protrusions of various configurations may be used to transfer the desired force to the substrate 30a. Each pre-stressor 90 may be disposed adjacent front surface 34a of substrate 30a and is further disposed opposite weld bars 82. Each pre-stressor 90 may include a predetermined height to bend substrate 30a such that the tension induced stretch on the back surface 32a matches the expected weld shrink to thus eliminate distortion in the area of weld bars 82.

Figure 9:
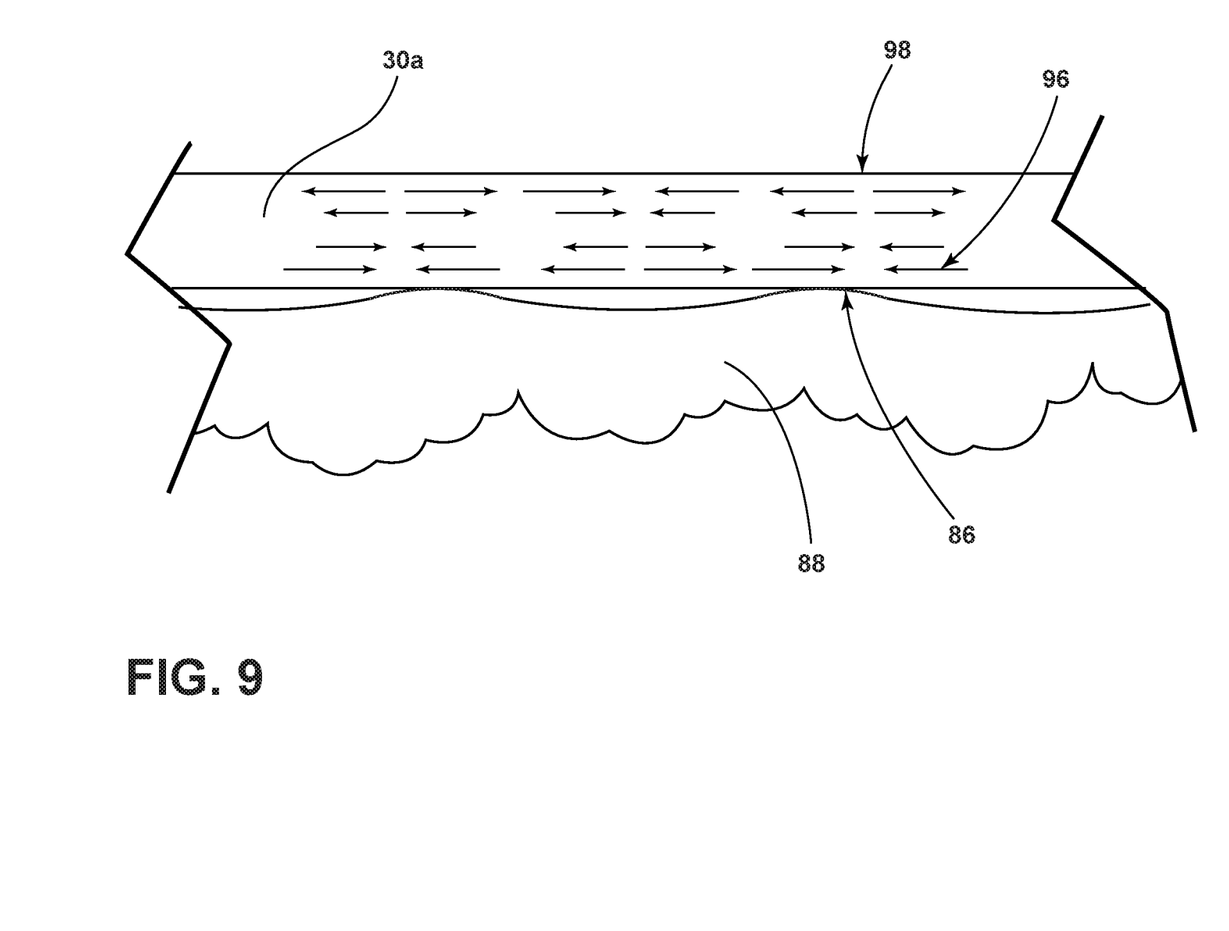
FIG. 9 is a schematic, cross-sectional, enlarged view of the welding apparatus of FIG. 8.

As shown in FIG. 9, modified weld fixture 88 may further include a plurality of holes (not shown) for creating compression in areas 96 and tension in areas 98 of substrate 30a upon the application of a vacuum to draw substrate 30a toward fixture 88. A vacuum seal (not shown) may be provided around substrate 30a for creating a vacuum as discussed above. Although a vacuum force is described herein, those skilled in the art would appreciate the application of similar forces to the modified weld fixture 88 and substrate 30a. Namely, instead of using vacuum to draw substrate 30a toward weld fixture 88, weld fixture 88 (and another upper weld fixture (not shown) for holding the protrusion 44a, i.e., air bag chute) may be simply pressed against substrate 30a (and protrusion 44a) to thus create the aforementioned compressed/tensioned areas.

The method of vibration welding protrusion 44a to substrate 30a will now be described in detail with reference to FIG. 8. Substrate 30a may be disposed relative to modified weld fixture 88, with front surface 34a of substrate 30a being disposed in contact with pre-stressors 90 of weld fixture 88. The substrate 30a may be laterally aligned relative to weld fixture 88 such that each pre-stressor 90 is disposed opposite the weld bars 82. A vacuum may then be created to draw substrate 30a towards weld fixture 88 via the holes (not shown) in weld fixture 88. In an exemplary embodiment, the vacuum may be generated at 13 psi, with the substrate 30a being maintained at room temperature. Further, in an exemplary embodiment, weld fixture 88 (and the weld fixture for protrusion 44a) may be machined aluminum and include a thin urethane layer to prevent scratching or damage to the grain of substrate 30a.

After vacuum application, substrate 30a may include compression in areas 96 and tension in areas 98 to thus create an uneven front surface 34a prior to vibration welding of protrusion 44a (see FIG. 9 for areas 96, 98). With weld fixture 88 held in place relative to substrate 30a, protrusion 44a including weld bars 82 (and another upper weld fixture (not shown) for holding the protrusion 44a) may be vibration welded to substrate 30a. With reference to FIG. 9, upon cooling of weld areas 98, the initial stretch due to tension in areas 98 is matched by the thermal shrinkage created by cooling of weld areas 98 to thus create a horizontal (or otherwise predetermined contoured) front surface 34a without distortion.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

It should be understood that variations are possible. For example, one or more pressure sensors (not shown) may be provided in one or both of pressure chamber 74 and/or NVF tool 60 so as to produce respective pressure signals indicative of the respectively sensed pressure levels. Through the foregoing, the achieved pressure levels in pressure chamber 74 and/or NVF tool 60 can be monitored and controlled. Additionally and/or alternatively, pressure levels may be sensed in the fluid supply source (not shown) coupled to pressure chamber 74 and/or the fluid vacuum source (not shown) coupled to NVF tool 60 rather than through pressure sensors in the respective chambers.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. It should be understood that while embodiments of the present disclosure have been described in connection with vehicles, embodiments of the disclosure may be applied to other applications and are not limited to vehicle applications. All directional references (e.g., plus, minus, upper, lower, upward, downward, inner, outer, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A method of manufacturing an automotive interior component, comprising: providing a cover comprising an outer layer having a first outer surface and a foam layer having a second inner surface opposite of the first outer surface, wherein the outer layer and the foam layer comprise different materials; providing a substrate; providing an inflatable restraint chute connected to the substrate wherein the substrate includes a first outer surface and a second inner surface opposite of the first outer surface, wherein the inflatable restraint chute comprises a protrusion extending from me second inner surface of the substrate in a direction away from the first outer surface of the substrate, and wherein the protrusion defines an undercut area with respect to the second inner surface of the substrate, wherein the second inner surface of the foam layer is configured to contact the first outer surface of the substrate; heating the cover; forming the heated cover via a negative vacuum forming tool having a first chamber in which a predetermined vacuum level is produced; wherein the forming step of the heated cover occurs prior to engaging the negative vacuum forming tool with a buck; loading the substrate and chute into a buck such that the protrusion of the inflatable restraint chute is received in a second chamber defined between the buck and the substrate; moving at least one of the negative vacuum forming tool and the buck toward the other of the negative vacuum forming tool and the buck such that the cover and the substrate are in contact with each other; and, bonding the substrate with the cover via providing pressurized fluid to the second chamber of the buck to force the substrate toward the cover thereby making the automotive interior component.

2. The method of claim 1 wherein the bonding includes using an adhesive.

3. The method of claim 1 wherein the bonding comprises applying pressurized fluid to the second, inner surface of the substrate in an area of the chute.

4. The method of claim 3 further comprising applying a mechanical force using the buck to the second, inner surface of the substrate to at least a first area of the substrate outside of the area of the chute.

5. The method of claim 3 wherein the bonding comprises applying an adhesive to at least one of the first outer surface of the substrate and the second inner surface of the foam layer of the cover.

6. The method of claim 1 wherein the loading of the substrate and chute into the buck occur while the cover is heated during the heating the cover.

7. The method of claim 1 further comprising moving the negative vacuum forming tool and the buck away from each and removing the bonded substrate and cover defining the automotive interior component.

8. The method of claim 1, wherein providing the substrate comprises:
   providing a weld fixture including at least one pre-stressor protrusion;
   placing the at least one pre-stressor protrusion against the substrate;
   generating a force to press the weld fixture against the substrate to create compression in a first surface of the substrate where the weld fixture contacts the substrate and to create tension in a second surface of the substrate; and,
   vibration welding the protrusion to the substrate such that a weld bar of the protrusion is welded to the second surface of the substrate.

9. The method of claim 1 wherein the forming the cover further comprises:
   providing the negative vacuum forming (NVF) tool with an outer surface comprising a predetermined pattern to be impressed in the first outer surface of the cover;
   moving the heated cover so as to overlay the outer surface of the NVF tool; and
   removing a fluid from the first chamber to produce the predetermined vacuum level in the first chamber to pull the cover toward the outer surface of the NVF tool to deform the first outer surface of the cover according to the outer surface of the NVF tool, to thereby impress said predetermined pattern in the first outer surface of the cover.

10. The method of claim 9 wherein the predetermined pattern is selected from the group comprising a leather grain pattern and a stitching pattern.

11. The method of claim 9 wherein the removing a fluid comprises:
 providing an atmospheric pressure to prevail on the second inner surface of the cover wherein the predetermined vacuum level is relative to atmospheric pressure to thereby establish a pressure differential across the cover to effect said pull of the cover toward the outer surface of the NVF tool.

* * * * *

UNITED STATES PATENT AND TRADEMARK OFFICE
CERTIFICATE OF CORRECTION

PATENT NO. : 10,399,279 B2  
APPLICATION NO. : 15/406130  
DATED : September 3, 2019  
INVENTOR(S) : Gregg S. Evans Page 1 of 1

It is certified that error appears in the above-identified patent and that said Letters Patent is hereby corrected as shown below:

In the Claims

Column 10, Line 23 Claim 3, delete "," after "second", and Column 10, Line 26 Claim 4, delete "," after "second"

Signed and Sealed this  
Eighth Day of October, 2019

Andrei Iancu  
*Director of the United States Patent and Trademark Office*